(12) United States Patent
Roesgen et al.

(10) Patent No.: US 8,535,519 B2
(45) Date of Patent: Sep. 17, 2013

(54) FILTER ELEMENT AND FUEL FILTER

(75) Inventors: Andre Roesgen, Remshalden (DE); Guenter Jokschas, Murrhardt (DE)

(73) Assignee: Mann+Hummel GmbH, Ludwigsburg (DE)

( * ) Notice: Subject to any disclaimer, the term of this patent is extended or adjusted under 35 U.S.C. 154(b) by 462 days.

(21) Appl. No.: 12/671,027

(22) PCT Filed: Jul. 22, 2008

(86) PCT No.: PCT/EP2008/059563
§ 371 (c)(1), (2), (4) Date: Jun. 29, 2010

(87) PCT Pub. No.: WO2009/016063
PCT Pub. Date: Feb. 5, 2009

(65) Prior Publication Data
US 2010/0276346 A1    Nov. 4, 2010

(30) Foreign Application Priority Data

Jul. 27, 2007  (DE) .................... 20 2007 010 603 U

(51) Int. Cl.
*B01D 35/18*    (2006.01)

(52) U.S. Cl.
USPC ...... 210/90; 210/167.06; 210/184; 210/493.1

(58) Field of Classification Search
CPC ...................................................... B01D 35/18
USPC ............ 210/167.06, 184, 185, 493.1–493.5, 210/90
See application file for complete search history.

(56) References Cited

U.S. PATENT DOCUMENTS

| | | | |
|---|---|---|---|
| 3,235,084 A | 2/1966 | King et al. | |
| 2008/0296288 A1* | 12/2008 | Girondi | 219/552 |

FOREIGN PATENT DOCUMENTS

| | | |
|---|---|---|
| DE | 2721607 A1 | 11/1978 |
| DE | 3624276 A1 | 1/1988 |
| EP | 1087128 A2 | 3/2001 |
| GB | 2140316 A | 11/1984 |
| WO | WO03098011 A1 | 11/2003 |

OTHER PUBLICATIONS

PCT search report for {CT/EP2008/059563, Nov. 2008.

* cited by examiner

*Primary Examiner* — Terry Cecil
(74) *Attorney, Agent, or Firm* — James Hasselbeck

(57) ABSTRACT

The invention concerns a filter element (1), in particular of a fuel filter for motor vehicles. The filter element (1) is provided for exchangeable use in a filter housing (2) and comprises a filter body (3) with a filter material (5) that is arranged in folds (4). Between two folds (4) a heating element (6) for the fuel is arranged.

9 Claims, 1 Drawing Sheet

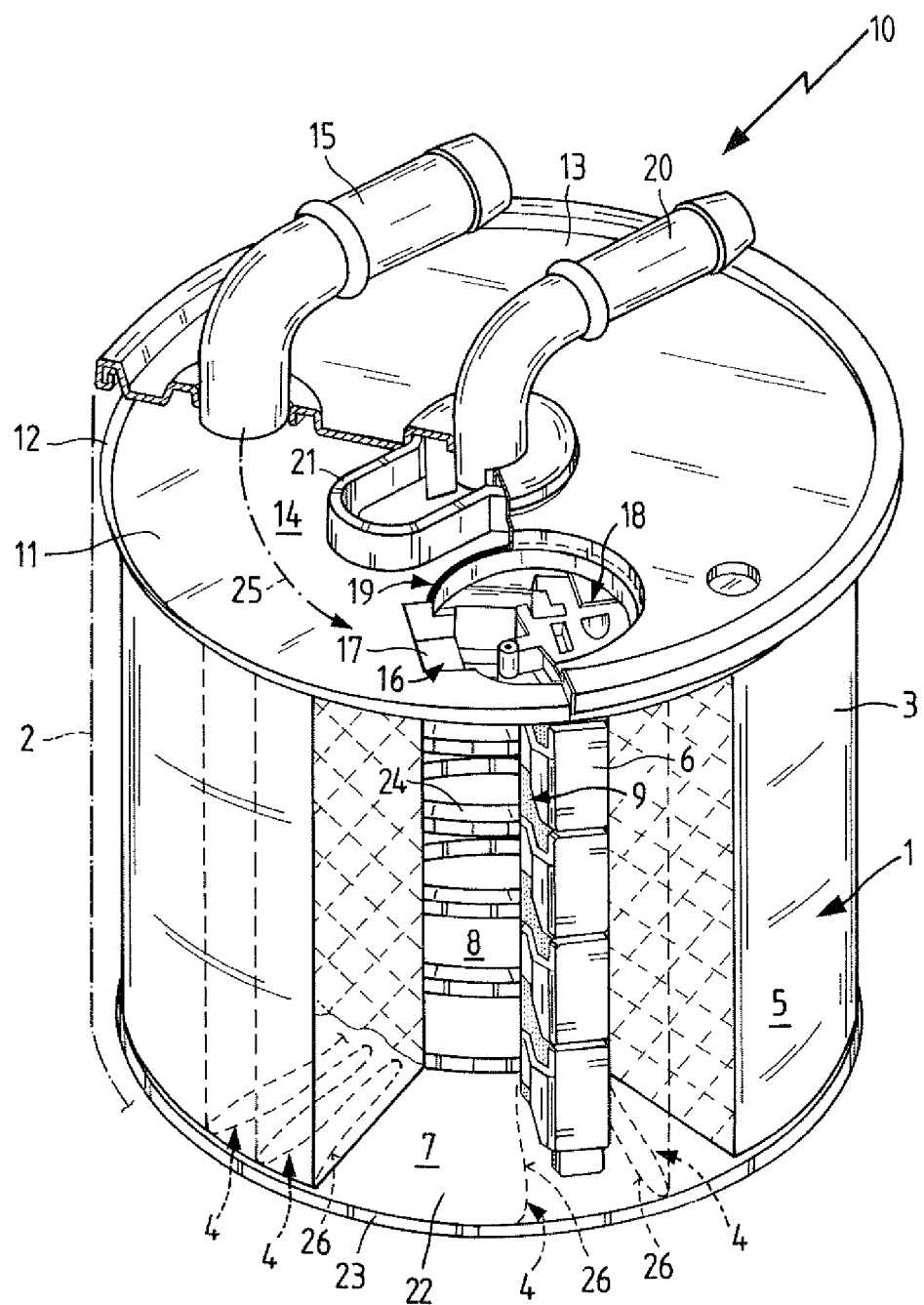

FILTER ELEMENT AND FUEL FILTER

CROSS REFERENCE TO RELATED APPLICATIONS

This application is US National Stage Entry of international patent application no. PCT/EP2008/059563, filed Jul. 22, 2008 designating the United States of America, the entire disclosure of which is incorporated herein by reference. Priority is claimed based on Federal Republic of Germany patent application no. 20 2007 010 603.3, filed Jul. 27, 2007.

TECHNICAL FIELD

The invention concerns a filter element, in particular of a fuel filter for motor vehicles as well as a fuel filter.

PRIOR ART

The flowability of fuel decreases with dropping temperatures. Particularly diesel fuel has a tendency to gel at wintery temperatures which leads to disruptions of the fuel supply of the vehicle motor. The gelled fuel in particular clogs the fuel filter that is arranged in the low-pressure circuit of the fuel supply so that its flow resistance increases excessively. The drive motor cannot be supplied with the required flow rate of the fuel. A complete interruption of the fuel flow is possible.

To avoid the aforementioned disadvantages, heated fuel filters are used, in particular for diesel vehicles. In known constructions the filter housing has an integrated electrical heater that heats the fuel flowing through and in this way generates the desired low viscosity of the fuel. The manufacture of such a filter housing is complex and cost-intensive. A significant portion of the generated heat output is used for heating the fuel filter and its housing. Only a portion of the heat output is available for the desired heating of the fuel. The fuel stream that is flowing through only contacts proportionally the heated housing walls so that a non-uniform heating occurs.

The invention has the object to further develop a filter element of the aforementioned kind in such a way that its efficiency is improved.

This invention is solved by a filter element

The invention has moreover the object to further develop a fuel filter of the aforementioned kind such that, without impairment of operational safety, a more compact construction is achievable.

This invention is solved by a fuel filter

SUMMARY OF THE INVENTION

A filter element, in particular of a fuel filter for motor vehicles, is proposed that is provided for exchangeable use in a filter housing. The filter element comprises a filter body with a filter material that is arranged in folds. Between two folds of the filter material a heating element for the fuel is arranged. The heating element in this connection is advantageously arranged on a raw side of the filter body. The arrangement according to the invention of the heater element between two folds requires neither additional space in the filter element nor in the filter housing. The heating element that is especially an electric one is positioned directly within the fuel flow so that an immediate and therefore loss-free heat transfer is achievable. With a compact construction and minimal heating power the flowability of the fuel flow can be maintained. The arrangement of the heating element at the raw side prevents reliably clogging of the filter material. The heating element that is in particular fixedly connected to the filter body is exchanged together with the filter body in accordance with the prescribed servicing intervals so that age-related functional failures of the heating element are prevented. As a whole, the efficiency of the filter element is improved and thus a reliable, operationally safe fuel supply of the drive motor is ensured.

The fuel filter according to the invention, in particular for motor vehicles, comprises a filter housing and the aforementioned filter element that is exchangeable. In this connection, the filter element has a terminal disk with a circumferentially extending seal for sealing relative to the filter housing. Between the terminal disk and a lid part of the filter housing a supply chamber is formed into which opens a supply line. The terminal disk has a through opening that adjoins the heating element. Advantageously, the through opening is provided with a hydrodynamic conducting body. The terminal disk with the seal arranged thereat generates together with the lid part of the filter housing a supply chamber that as a whole is fluid-tight and through which the incoming fuel is supplied to the through opening. In particular with the action of the hydrodynamic conducting body, the fuel flow is guided through the through opening directly to the heating element. The fuel flow is heated as a whole and homogeneously to the desired degree before it flows from the raw side through the filter material to the clean side. The formation of local sites where fuel is heated unsatisfactorily is avoided.

In an advantageous further embodiment the heating element is sealed relative to the lid part with a seal wherein the lid part has a contact opening for electric connecting contacts of the heating element. While easy exchangeability of the filter element is provided, the fuel flow is reliably separated from the electric connecting contacts. In case of servicing work, electrical plugs can be removed easily from the connecting contacts and can be pushed on again without having to take care of fuel seal-tightness. The servicing work that has to be carried out in this connection can be performed easily while any faulty operation is avoided.

The heating element has advantageously a differential pressure sensor for detecting a differential pressure between the raw side and the clean side of the filter body. In particular, the differential pressure sensor is provided for controlling an electric fuel pump in the low-pressure circuit of the fuel supply and/or for controlling the heating power of the heating element. The differential pressure between raw side and clean side that is generated as a result of the flow resistance of the filter element is utilized as a measure for the fuel viscosity that changes with temperature. When the determined differential pressure increases undesirably as a result of fuel that is too cold and therefore too viscous, alternatively or in combination the conveying output of the electric fuel pump and/or the heating power of the heating element can be increased. As an alternative to the governing action, it may also be expedient to employ a threshold control or the like.

BRIEF DESCRIPTION OF THE DRAWINGS

One embodiment of the invention will be explained in the following with the aid of the drawing in more detail. The only FIGURE shows in a partially sectioned illustration a diesel fuel filter with a filter element embodied in accordance with the invention with integrated fuel heater.

EMBODIMENT OF THE INVENTION

The only FIGURE shows in a partially sectioned illustration a fuel filter 10 for diesel fuel for a motor vehicle that is embodied in accordance with the present invention. Other applications and in particular other fuel types can be envisioned also. The fuel filter 10 comprises a filter housing 2 that is closed off by a detachable lid part 13. In the filter housing 2 an exchangeable filter element 1 is secured which is removed in predetermined servicing intervals after detachment of the lid part 13 and is replaced with a new filter element 1.

The filter element 1 comprises a filter body 3 with a filter material 5 that is arranged in folds 4. As filter material 5 filter paper is provided. However, other filter materials 5 may be expedient also. The extension of the folds 4 is indicated by dashed lines 26. The filter housing 2 and the filter body 3 are substantially embodied to be cylindrical wherein the folds 4 extend in radial direction and parallel to the longitudinal axis of the cylindrical filter element 1 or the cylindrical filter housing 2. External to the filter material 5 in radial direction there is the raw side 7 of the filter element 1. In the radial inner area an approximately cylindrical cavity is provided that forms the clean side 8 of the filter element 1. In operation, the filter material 5 is flown through radially from the outer raw side 7 to the inner clean side 8. When doing so, a differential pressure between the raw side 7 and the clean side 8 is generated that acts inwardly in the radial direction on the filter material 5. For supporting the filter material 5 relative to this differential pressure, a support grid 24 is arranged inwardly in radial direction.

At both end faces, the filter body 3 has a terminal disk 11, 22, respectively, having at their edges seals 12, 23 that extend circumferentially about the circumference in the form of elastic sealing lips. The seal 12 arranged in the area of the lid part 13 seals the terminal disk 11 relative to the filter housing 2 as well as relative to the lid part 13. The seal 23 of the axially oppositely positioned terminal disk 22 is resting seal-tightly against the inner circumferential surface of the filter housing 2. In the terminal disk 11 that is facing the lid part 13 a through opening 16 is integrally formed. The two terminal disks 11, 22 with their sealing lips 12, 23, the circumferential wall of the filter housing 2, and the filter body 3 delimit a closed annular space at the raw side 7 of the filter element 1 whose only access is the through opening 16.

As a result of the circumferentially extending seal 12, there is also a closed supply chamber 14 formed between the terminal disk 11 and the lid part 13 into which a supply opening 15 opens. Into this supply chamber 14 fuel is introduced through the supply line 15. The fuel flows in accordance with arrow 25 through the supply chamber 14 to the through opening 16 and through it into the afore described annular space of the raw side 7. From here the fuel flow is guided radially from the exterior to the interior through the filter material 5 into the radially inwardly positioned space that defines the clean side 8 from where the fuel flows out through a central outlet line 20 of the lid part 13. For separating the supply chamber 14 from the outlet line 20, a seal 21 is arranged between the terminal disk 11 and the lid part 13 and extends circumferentially about the mouth of the outlet line 20.

Between two folds 4 of the filter material 5 an electric heating element 6 for the fuel is arranged. For this purpose, the two neighboring folds 4 are spread apart in the circumferential direction in order to provide sufficient space for the heating elements 6. The heating element 6 is positioned relative to the circumferential contour of the filter body 3 inwardly displaced in the radial direction and is fixedly connected to the filter element 1. At the predetermined servicing intervals an exchange of the filter body 3 together with the heating element 6 is provided.

The heating element 6 extends parallel to the axis of the filter body 3 between its two terminal disks 11, 22. A contact opening 18 is formed integrally in the lid part 13 and the adjoining terminal disk 11 which contact opening enables an electric plug connection with electrical connecting contacts of the heating element 6 and a differential pressure sensor 9 to be described infra. The heating element 6 is sealed relative to the lid part 13 and the terminal disk 11 with a seal 19 circumferentially surrounding the contact opening 18. In this way, the electric connecting contacts are kept away from the fuel flow.

The through opening 16 of the terminal disk 11 that is seal-tightly closed off relative to the contact opening 18 adjoins the correlated end face of the heating element 6; the hydrodynamic conducting body 17 integrally formed in the terminal disk 11 ensures a controlled flow of the fuel introduced through the through opening 16 toward the heating element 6. The fuel flow is guided approximately axis-parallel along the heating element 6 and is heated thereby. Subsequently, it is distributed in the afore described annular space of the raw side 7 before it passes in the radial direction inwardly through the filter material 5 to the clean side 8. In an exemplary fashion, a single heating element 6 is shown between two folds 4 with a correlated through opening 16. However, it may also be expedient to provide two or more heating elements 6 with a corresponding number of through openings 16.

The heating element 6 is also provided with a schematically indicated differential pressure sensor 9 which is provided for detecting a differential pressure between the raw side 7 and the clean side 8 of the filter body 3. The differential pressure of the fuel flow that is generated upon passing through the filter element 1 from the raw side 7 to the clean side 8 is determined by the differential pressure sensor 9 and is used by a non-illustrated control or governing unit as a measure for the viscosity of the fuel. Depending on the determined measured value the conveying output of an electric fuel pump, not illustrated, in the low-pressure circuit of the fuel supply and/or the heating power of the heating element 6 can be controlled or regulated in order to ensure a satisfactory volume flow of the fuel through the fuel filter 10 even at low temperatures of the surroundings.

The invention claimed is:

1. A filter element of a motor vehicle fuel filter, comprising:
   a filter body for installation into a filter housing, said filter body having a raw unfiltered side and a clean filtered side, said filter body including;
   a terminal disk having a through opening;
   a circumferential elastic seal secured to said terminal disk and extending circumferentially around an outer circumference of said terminal disk;
   a cylindrical filter material arranged into a plurality of folds within said filter body;
   wherein two neighboring folds of said filter material are spread apart in a circumferential direction wider than other pairs of neighboring folds of said plurality of folds to form an installation space between said two neighboring folds; and
   a block-shaped heating element extending substantially parallel with an axis of said cylindrical filter media and arranged in said installation space to be spaced from and between said two neighboring folds at a radially outer side of said filter material;
   wherein said heating element is positionally correlated with said through opening of said terminal disk;
   wherein said heating element is arranged to heat fuel in said filter body;

wherein said filter element is configured for use in said filter housing.

2. The filter element according to claim 1, wherein the heating element is arranged on the raw side of the filter body.

3. The filter element according to claim 2, wherein the heating element comprises a differential pressure sensor configured to detect and responsive to differential pressure between the raw side and the clean side of the filter body.

4. The filter element according to claim 3, wherein the pressure sensor is connected to control an electric fuel pump in the low-pressure circuit of the fuel supply and/or control heating power supplied to the heating element.

5. The filter element according to claim 4, wherein the heating element is fixedly connected to the filter body and configured to enable exchange/replacement together with the filter element.

6. A fuel filter for motor vehicles comprising:
- a filter housing including a lid part;
- a filter element according to claim 1 replaceably received into said housing;
    - wherein said circumferential seal of said terminal disk forms a seal between the terminal disk and the lid part of the filter housing;
- said terminal disk together with said lid part and said circumferential seal defining a supply chamber within said filter housing;
- a supply line in fluid communication with said supply chamber and configured to supply fuel to said supply chamber; and
- wherein said through opening in said terminal disk adjoins said heating element.

7. The fuel filter according to claim 6 wherein in the filter element
- the heating element is arranged on the raw side of the filter body;
- wherein the heating element comprises a differential pressure sensor configured to detect and responsive to differential pressure between the raw side and the clean side of the filter body;
- wherein the pressure sensor is connected to control an electric fuel pump in the low-pressure circuit of the fuel supply and/or control heating power supplied to the heating element; and
- wherein the heating element is fixedly connected to the filter housing and configured to enable exchange/replacement together with the filter element.

8. The fuel filter according to claim 6, wherein the through opening (16) is connected to a hydrodynamic conducting body (17) configured to guide fuel flowing into said through opening directly to the heating element.

9. The fuel filter according to claim 8, further comprising
- electrical connecting contacts secured on said heating element and accessible through a contact opening provided in said lid part; and
- a seal sealing between said lid part and said heating element configured to isolate said contacts from fuel flow.

* * * * *